Dec. 8, 1964 P. M. CUNNINGHAM ETAL 3,160,816
ISO-ECHO INTERFERENCE BLANKING WITH OUTPUT
A LOGARITHMIC FUNCTION OF RADIO
FREQUENCY ENERGY INPUT
Filed Sept. 14, 1961 2 Sheets-Sheet 1

INVENTORS
PAUL M. CUNNINGHAM
THEODORE P. KAUFMAN
BY
Moody & Anderson
AGENTS

INVENTORS
PAUL M. CUNNINGHAM
THEODORE P. KAUFMAN
BY Moody & Anderson
AGENTS

United States Patent Office 3,160,816

Patented Dec. 8, 1964

3,160,816

ISO-ECHO INTERFERENCE BLANKING WITH OUTPUT A LOGARITHMIC FUNCTION OF RADIO FREQUENCY ENERGY INPUT

Paul M. Cunningham, Richardson, and Theodore P. Kaufman, Plano, Tex., assignors to Collins Radio Company, Cedar Rapids, Iowa, a corporation of Iowa Filed Sept. 14, 1961, Ser. No. 138,132

12 Claims. (Cl. 325—475)

This invention relates generally to video blanking techniques and more particularly to a means of cancelling those portions of a radio video signal due to strong interference signals and for further selectively cancelling those portions of a video signal emanating from received energy in excess of a predetermined magnitude.

The present invention is primarily adaptable for but not necessarily limited to incorporation with a weather radar system in which video signal is displayed as a measure of precipitation intensity encountered by a searching radar beam. Known expedients in the art provide means for cancelling portions of the video signal in weather radar receivers such that areas of extreme weather turbulence may be more effectively displayed by the "iso-echo" technique by being "blacked out" in the presentation system.

The present invention relates to the provision of an "iso-echo" arrangement for a weather radar of the type employing a logarithmic video response characteristic. It is well known in the art that the provision of a video detection scheme wherein the output is a logarithmic function of the radio frequency energy input enables the reception of signals over extremely wide dynamic range and provides a video response of improved tonal quality for more exacting target definition.

The present invention relates to incorporation of a weather contour or iso-echo video presentation for embodiment with a logarithmic detection scheme.

Still a further object of the present invention is the provision of a video signal development arrangement of the type providing iso-echo techniques with a logarithmic response which, in addition, includes provisions for cancellation of interference signals without detriment to the desired iso-echo operation.

A further object of the present invention is the provision of a weather radar video signal development means operable over an improved dynamic range. The invention is featured in the combination of first and second threshold sensing networks operating in response to detected video signals from the first stage and a subsequent stage of a cascaded arrangement of radio frequency amplifiers of a type providing a substantially logarithmic output characteristic.

A further feature of the present invention is the provision of a logarithmic response video detection arrangement including compatible noise cancellation and iso-echo techniques whereby the output may be direct coupled to display apparatus due to a novel arrangement of insuring an exacting base-line control over the complete operating dynamic range. This feature is of especial importance should the display apparatus incorporate a direct view storage tube where any overshoot of the video into the "blacker than black" area would produce an undesirable smearing effect on the viewing screen.

These and other features and objects of the present invention will become apparent upon reading the following description in conjunction with the accompanying drawings in which.

Figure 1:
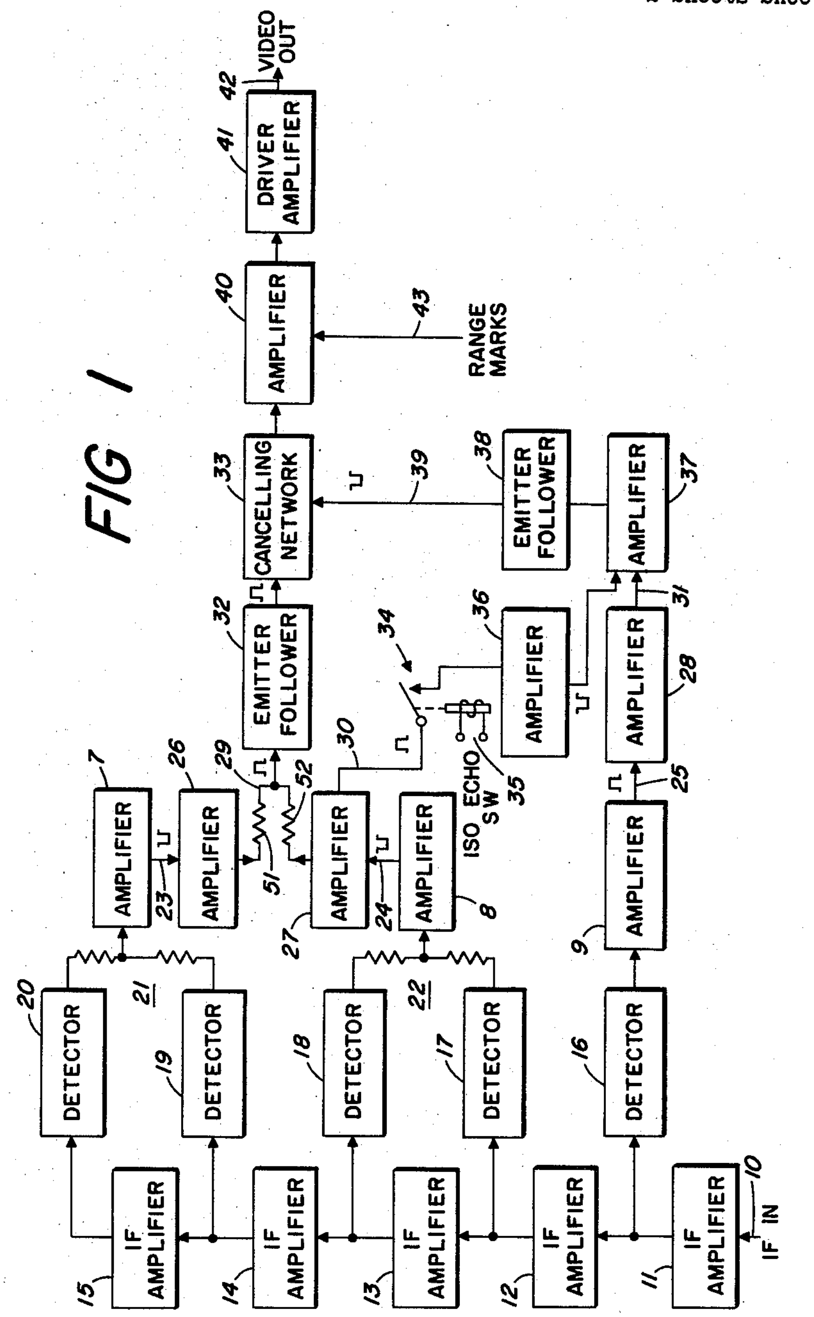
FIGURE 1 is a functional block diagram of an embodiment of the present invention.

As above discussed the present invention permits the attainment of interference and weather contouring video cancellations in a video development network having a logarithmic response. To this end, the embodiment of FIGURE 1 includes a plurality of intermediate frequency amplifiers to which a radio frequency input 10 from a radio receiver (not illustrated) connects for detection. Amplifiers 11 through 15 are cascaded for successive amplification of the input signal 10. Each of the amplifiers 11 through 15 is saturable at a predetermined input signal level and it may be seen that an increasing input signal will first effect saturation of amplifier 15 and successively effect saturation of amplifiers 14, 13, etc., respectively. The outputs from each of the amplifiers 10–15 is individually detected through amplitude detectors 16–20 respectively. The logarithmic response is accomplished by parallel addition of the outputs of detectors 17–20. The outputs from detectors 17 and 18 are added in a network 22 to provide an input to an amplifier 8 which develops a summation signal 24. The outputs from detectors 19 and 20 are added in the resistive network 21 and the combined signal amplified in amplifier 7 to provide a second summation signal 23. The summation signals 23 and 24 are further amplified in amplifiers 26 and 27 respectively and the outputs therefrom are combined in the resistive network 51–52 to provide a composite video summation signal 29 the amplitude of which is essentially the logarithm of the amplitude of radio frequency input signal 10.

The logarithmic response is due to successive saturation of the plurality of cascaded I.F. amplifiers 11–15. The output from each individual detector 17–20 is linear with respect to the applied radio frequency signal 10 until its associated I.F. amplifier stage saturates. With saturation of the associated amplifier stage, the output from the detector is constant for any further increase in the radio frequency input signal 10. As the input signal 10 is increased from zero, the output from each of detectors 17–20 is linear until the magnitude of input signal 10 is sufficient to saturate the final I.F. amplifier stage 15. Prior to saturation of I.F. amplifier 15, four linearly increasing signals are added together such that the composite video output signal 29 is a linear function of the radio frequency input signal 10. With saturation of the last amplifier stage 15, however, a constant is being added to three linearly increasing signals and the output 29 is no longer linear. At some input level above the point where the final amplifier stage 15 saturates, the previous stage 14 goes into saturation. At this point two constant signals are seen to be added to two linearly increasing signals. At a still higher level of input signal, amplifier stage 13 saturates and at a still higher level, stage 12 saturates. The parallel addition of the detected outputs from the last four stages 12 through 15 provides an approximately logarithmic response as concerns the composite video signal 29.

The output of the first I.F. amplifier 11 is detected by detector 16 and amplified by amplifier 9 to provide a detector output signal 25, which is a measure of the amplitude of the radio frequency input signal 10 after a single stage of amplification. The output of amplifier 9 is connected to a first threshold sensitive amplifier 28 which provides an output 31 which corresponds to those portions of the output from detector 16 exceeding a predetermined threshold. The output from amplifier 28 is further amplified in amplifier 37 and an emitter follower amplifier 38 to provide a cancelling signal 39 for application to a signal cancelling network 33. Cancelling network 33 receives a second input from an emitter follower amplifier 32 which is seen to be the composite video output from the last four I.F. amplifier stages, the magnitude of which is a logarithmic function of the radio frequency input signal 10.

The output from the first detector 16 thus applies a cancelling signal 39 to cancelling network 33 when the output from the first I.F. amplifier 11 exceeds a predetermined threshold. Strong received signals, such as interference signals from nearby radars, may be of sufficient magnitude to develop an output from the first detector 16 sufficient to overcome a predetermined threshold set for amplifier 28 and thus develop a video cancelling signal 39 such that the normal combined video output from the cancelling network 33 is cancelled for that portion of the video signal corresponding to the interference signal. Cancelling network 33 is basically a signal combining network providing a clamped summation of the inputs thereto. The relative magnitude of the cancellation input signal 39 as compared to the composite video input signal 29 may be readily chosen to effect a complete concellation of that portion, or those portions, of the composite video signal corresponding to strong interference signals present in the radio frequency input 10.

Since the logarithmic video response is developed from successive saturation of the cascaded I.F. amplifier stages 10–15, the detected level at the output of the first I.F. amplifier is utilized for interference blanking purposes. This enables selection of an interference threshold at a stage of amplification which is unsaturated.

A second source of signal for cancellation network 33 is developed from the combined output from detectors 17 and 18 as they appear at the output of amplifier 8. This output is selectively connected to a second threshold sensitive amplifier 36 through closed contacts of an iso-echo relay 34. Amplifier 36 provides an output corresponding to those portions of the radio frequency input signal 10 which produces a combined output from detectors 17 and 18 which is in excess of a second predetermined threshold. The output from amplifier 36 is applied through amplifier 37 and emitter follower amplifier 38 to provide the second source of cancellation signal 39 to the cancellation network 33. Thus when the iso-echo relay is closed, a contouring of the composite video signal is accomplished by cancellation from the composite video output of those portions exceeding the second or contour threshold level.

The iso-echo or weather contour threshold is established in conjunction with the detection of the amplified input signal in second and third detectors where comparatively low level output is present and the associated amplifier stages are not in saturated condition.

It is to be realized that the first I.F. amplifier stage is the last to saturate when considering an increasing radio frequency 10, and that the establishment of precise levels at which the above discussed interference and contour cancellations are effected depends upon the monitoring of the received signal in those stages of amplification which are not over driven into saturation at the chosen thresholds. Two video cancellations are thereby realized, the first being that for establishing interference rejection by monitoring an output from the first detector and the second being a video cancellation for weather contouring as a result of large amplitude signals appearing at the outputs of the second and third detectors.

Figure 2:
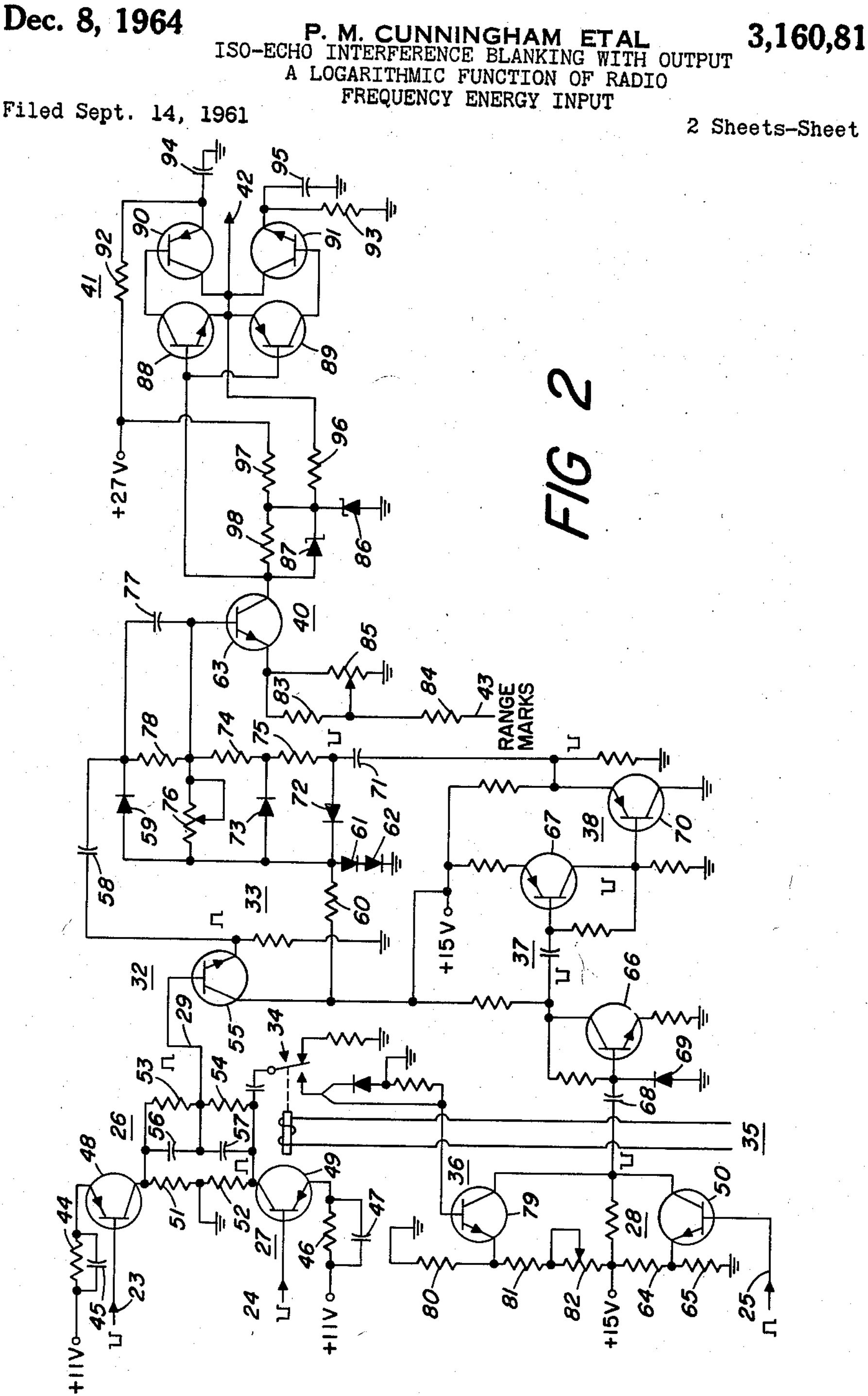
FIGURE 2 is a schematic diagram of the output portion of the embodiment of FIGURE 1.

The manner in which the above described thresholds are established and the desired video cancellations and maintenance of D.C. level at the output are realized may best be comprehended by reference to the schematic diagram of FIGURE 2, which illustrates a transistorized embodiment of the output portion of the system functionally illustrated in FIGURE 1.

Three inputs are connected to the circuitry of FIGURE 2 in the form of video signals 23, 24 and 25. Video signal 23 is the combined output of detectors 19 and 20 as amplified in amplifier 7 of FIGURE 1; video signal 24 is a like-polarity video signal which is the combined outputs of detectors 17 and 18 as amplified in amplifier 8 of FIGURE 1; and video signal 25 is a reversed polarity video signal corresponding to the output of the first detector 16 as amplified in amplifier 9 of FIGURE 1. Components in the circuitry of FIGURE 2 and the corresponding portions of the block diagram of FIGURE 1 are assigned like reference numerals.

The combined output 23 of detectors 19 and 20 of FIGURE 1 is taken from an amplifier 7, which might be an emitter-follower transistorized amplifier, and applied as the input to amplifier stage 26 which comprises a transistor 48. The combination of capacitor 45 and resistor 44 in the emitter circuit of transistor 48 compensates for high frequency attenuation in amplifier 26.

The combined outputs from detectors 17 and 18 of FIGURE 1 are combined in a similar emitter-follower transistorized stage 8 and connected as an input 24 to amplifier 27. Amplifier 27 comprises a transistor 49 including a combination of capacitor 47 and resistor 46 in its emitter circuits to compensate for high frequency attenuation.

Resistor 51 is the collector load for transistor 48 and resistor 52 is the collector load for resistor 49. The outputs of the transistors 48 and 49 as they appear on the respective collectors are added through the combination of resistors 53 and 54 and the input impedance to the following stage 33, the latter comprising an emitter-follower circuit including transistor 55. Capacitors 56 and 57 which respectfully shunt resistors 53 and 54 in the output circuit are included to compensate for high frequency attenuation of the combined output signal 29 due to the input capacitance of transistor 55 in the following stage. Transistor 55 is employed as an emitter follower such that the stage 32 provides a low output impedance for the combined output 29 of detectors 19 and 20 into the cancelling network 33. The output from emitter follower 55 is provided with a positive going clamp formed by capacitor 58 and diode 59 in the cancelling network. A voltage divider is provided by resistor 60 in the collector circuit of transistor 55 and the forward resistances of diodes 61 and 62 to reference ground. The voltage developed by this voltage divider at the junction between resistor 60 and diode 61 establishes a reference for the clamp to realize a regulated forward bias for the ensuing amplifier stage 40 which comprises a transistor 63.

The output of detector 16 of FIGURE 1 is amplified by amplifier 9 and appears as a positive-going video signal 25 which is applied to the base of transistor 50 in amplifier stage 28. Transistor 50 is normally cut off due to the bias on its emitter determined by resistors 64 and 65. When the input signal 25 from amplifier 9 in FIGURE 1 is sufficient to overcome this bias, a negative-going pulse is present at the collector of transistor 50. This negative pulse is amplified by ensuing stages including transistors 66 and 67 which are generally designated as amplifier 37. Capacitor 68 is connected between the collector of transistor 50 and the base of transistor 66 and diode 69 is connected between the base of transistor 66 and common ground. Diode 69 conducts in response to an abnormally high negative peak to prevent negative voltage on the base of transistor 66. Transistor 66 and 67 are normally conducting and transistor 66 is cut off by the clamped negative pulse which is developed from transistor 50. Transistor 67 in turn is cut off by the positive pulse appearing at the collector of transistor 66. This results in a negative pulse appearing on the collector of transistor 67 which is applied to the base of transistor 70 in emitter-follower stage 38. Transistor 70 is normally cut off and is driven into conduction by the negative pulse from transistor 67. The output from the transistor 70 is likewise a negative pulse which is provided as a second input 39 to the cancelling network 33.

In operation a positive-going combined video signal 29 is applied through emitter-follower 32 and appears as a positive pulse on the emitter of transistor 55. This positive-going combined video signal is clamped by capacitor 58 and diode 59 to a positive-going signal at the junction of capacitor 58 and diode 59. When the output from detector 16, as it is ultimately applied to amplifier 28, is sufficient to cause transistor 50 to conduct, a negative-going signal from emitter-follower 38 is present at the junction of capacitor 71 and diode 72 in the cancelling network. Diode 73 in the cancelling network prevents the voltage at the junction of resistors 74 and 75 from going negative.

Thus, with a video signal of normal level, a positive signal is present at the junction of capacitor 58 and diode 59 and applied to the base of transistor 63 of amplifier 40 from the junction of resistors 78 and 74 in the cancelling network. In the presence of a very large video signal as detected by the first detector 16, the threshold of amplifier 28 is overcome and a much larger amplitude negative cancellation signal 39 causes the voltage at the junction of resistors 74 and 75 to drop to essentially ground reference but actually to a slightly negative value due to the voltage drop across diode 73. In essence, a complete cancellation is effected to the ground reference level for the duration of a negative pulse from emitter follower 38 which is due to high level interference energy.

The level of the video signal at the base of transistor 63 is therefore linear with respect to the applied video signal up to the point where emitter-follower 38 supplies a negative cancellation pulse. At this point the base of transistor 63 drops essentially to zero or ground reference and remains at this zero or ground reference until the radio frequency input signal applied to the logarithmic detector arrangement of FIGURE 1 drops below the level where a cancellation pulse is supplied by transistor 70.

Potentiometer 76 in the cancellation network functions as a video gain control. Capacitor 77 is connected by the junction of diode 59 and resistor 78 to the base of transistor 63 to compensate for high frequency attenuation and for the attenuation offered by resistor 78 and the input capacitance of transistor 63.

It may be seen then that a cancellation of the combined logarithmic video signal to essentially a zero or a ground reference is realized when the detected output from the first I.F. amplifier 11 is of sufficient level to overcome the predetermined threshold established by the cut-off bias for amplifier 28. It is to be emphasized that the cancellation is clamped at the zero reference such that the resulting video signal contains no portion which is substantially below ground reference.

The second cancellation of the combined video signal is incorporated to obtain weather contouring or an iso-echo effect. This second cancellation is selectively introduced and may be adjusted to occur at a preselected level of the input radio frequency energy to the development system. The output from detectors 17 and 18 as it appears on the collector of transistor 49 of amplifier 27 is, in addition to being added with the outputs from detectors 19 and 20 as previously described, applied through contacts of a relay 34 to the base of a second threshold sensitive amplifier 36 comprising transistor 79. Relay 34 may be selectively energized by application of a power source 35 such that the positive-going output from amplifier 27 is applied through the relay contacts to the base of transistor 79. Transistor 79 is normally cut off by the bias provided through the combination of resistors 80, 81 and 82 in the emitter circuit. The threshold of this cut-off bias may be adjusted by resistor 82 to establish a contour level threshold. When relay 34 is energized and the positive pulse from transistor 49 as applied to the base of transistor 79 is sufficient to overcome the contour level threshold and transistor 79 conducts to provide a further negative pulse to the input of transistor 66 in amplifier 37. This further negative input produces a negative output pulse from emitter-follower 38 to effect cancellation of the combined video signal being applied to cancelling network 33.

It is seen, then, that two video cancellations are effected. The first cancellation is for interference rejection resulting from extremely high level signals at the output of the first detector. The second cancellation provides weather contouring as a result of large amplitude signals at the outputs of subsequent detectors 17 and 18.

The combined video signal with or without the aforementioned cancellations is amplified in amplifier 40 and subsequently by a low impedance output driver stage 41 which comprises transistors 88, 89, 90 and 91.

Range marks 43 may be added to the video signal by application to the emitter circuit of transistor 63. Resistors 83 and 84 in the emitter circuit of transistor 63 provide a resistor divider shunt across a variable resistance 85 such that variation of resistance 85 (range marking intensity) has a minimum effect on the gain of the video signal. Resistor 97 and diode 86 in the collector circuit of transistor 63 serve as a decoupling network for transistor 63. Resistor 98 functions as the collector load resistor for transistor 63.

Zener diode 87 is included in the collector circuit of transistor 63 to assure that the voltage drop at the collector of transistor 63 does not exceed the breakdown voltage of the transistors in amplifier 41. In the driver amplifier stage 41, resistors 92 and 93 in the emitter circuits of transistors 90 and 91 respectively are bypassed by capacitors 94 and 95 to provide direct current voltage stabilization. Resistor 96 provides a direct current load for the driver and improves the direct current voltage stability with temperature changes.

The present invention thus provides a means for interference and weather contour cancellations in a video development circuit of the logarithmic response type. The cancellations are developed in response to low-level thresholds in the first and succeeding stage of detection. The system provides a means for effecting the video cancellations in a manner which is compatible with the logarithmic response. In either case cancellation is so effected that the resulting video output signal contains no detrimental overshoots into the "blacker-than-black" level.

Although this invention has been described with respect to a particular embodiment thereof, it is not to be so limited as changes might be made therein within the scope of the invention as defined by the appended claims.

We claim:

1. Video signal development means comprising a source of radio frequency input signals, a plurality of cascaded signal amplifying means including first amplifying means to which said source of radio frequency input signals is connected, each of said amplifying means being saturable at a predetermined level of input signal thereto, means for independently detecting the outputs from each of said cascaded amplifying means, means for adding in parallel the detected outputs from successive ones of said amplifying means exclusive of said first amplifying means, each of said detecting means subsequent to said first detecting means producing an output signal opposite in polarity to that of said first detecting means; a signal cancellation network, said signal cancellation network receiving said paralleled detector outputs, threshold sensitive amplifying means receiving the output from said first detecting means and producing therefrom an output corresponding to those portions of the output from said first detecting means in excess of a predetermined magnitude, the output from said threshold sensitive amplifying means being opposite in polarity to that of said paralleled detected outputs and connected to said signal cancelling network to effect a predetermined cancellation of those portions of said paralleled detector output signal developed in response to input radio frequency signals exceeding a predetermined magnitude, and an output signal taken from said signal cancellation network the amplitude of which corresponds to the logarithm of the amplitude of said radio frequency input signal with those portions corresponding to said input radio frequency signals in excess of said predetermined magnitude being substantially cancelled.

2. Video signal development means as defined in claim 1 further including a second threshold sensitive amplifying means receiving the output from preselected ones of said detecting means subsequent to said first detecting means, said second threshold sensitive amplifying means producing an output in response to those portions of the input thereto exceeding a second predetermined magnitude, and the output of said second threshold sensitive amplifying means being connected to said signal cancellation network to effect a further cancellation of said output signal in response to those portions of said radio frequency input signal producing an output from said subsequent detecting means in excess of said second predetermined magnitude.

3. Video signal development means as defined in claim 2 further including means for selecting said first and second predetermined magnitudes at which said first and second signal cancellations are effected.

4. Video signal development means as defined in claim 3 further including switching means connected between said subsequent detecting means and said second threshold sensitive amplifying means, said switching means being adapted in first and second positions thereof to respectively connect and disconnect said further threshold sensitive amplifying means from said subsequent detecting means.

5. In a video signal development system of the type comprising a plurality of cascaded radio signal amplifiers including a first amplifier to which an input signal is connected and a like plurality of detectors each connected to the output from one of said amplifiers and including a first detector receiving the output of said first amplifier; means for effecting cancellations of those portions of said input signal as applied to said first amplifying means, which portions exceed a predetermined magnitude; comprising means for adding the outputs of each of said detectors excluding said first detector in parallel whereby a combined video signal is developed of a first relative polarity with respect to a fixed reference, threshold sensitive amplifying means receiving the output of said first detector and developing therefrom in response to an input thereto exceeding a first predetermined threshold a second video signal of opposite relative polarity with respect to said fixed reference, signal combining means receiving said combined and second video signals, said signal combining means being adapted to develop from the inputs thereto an output signal corresponding to said combined video signal with those portions thereof corresponding to an output from said first detector with amplitudes exceeding said predetermined threshold being substantially cancelled.

6. A signal development system, as defined in claim 5, further comprising signal clamping means associated with said signal combining means whereby said predetermined cancelled portions of said first video signal are effected to a level substantially that of said fixed reference.

7. A signal development system, as defined in claim 6, further comprising second threshold sensitive amplifying means, the output from preselected ones of said detectors other than said first detector connected to said second threshold sensitive amplifying means, said second threshold sensitive amplifying means including threshold development means, said second threshold sensitive amplifying means in response to an input thereto exceeding a second predetermined threshold producing a further video output like that of said second video output, and means connecting said further video output to said signal combining means to effect substantial cancellation of said combined video signal of those portions corresponding to the duration of said further video output.

8. A signal development system as defined in claim 7 further comprising means for selectively adjusting said first and second predetermined magnitudes respectively defining said first and second predetermined thresholds at which cancellation is effected.

9. A signal development system as defined in claim 8 further comprising selectively activated switching means connected between said preselected ones of said detectors and said threshold sensitive amplifying means, said switching means in a first position thereof effecting connection between the output from said preselected ones of said detectors and said second threshold sensitive amplifying means.

10. In a video signal development means of the type comprising a plurality of cascaded amplifying stages including a first amplifying stage receiving a radio frequency input signal and means for detecting the outputs of each of said amplified stages; means for effecting first and second predetermined cancellations of those portions of a video output signal corresponding to radio frequency input signal in excess of first and second predetermined magnitudes; said means comprising means for combining by parallel addition the outputs from each of said detecting means subsequent to said first detecting means to develop a first video signal, the magnitude of said first video signal being substantially the logarithm of the magnitude of said radio frequency input signal, first threshold sensitive amplifying means receiving the output from said first detecting means and being adapted to produce an output corresponding to those portions of said first detector output in excess of a first predetermined threshold, second threshold sensitive amplifying means receiving the output from a preselected one of said subsequent detecting means and producing an output signal corresponding to those portions of the output of said subsequent detecting means in excess of a second predetermined threshold; a signal cancellation network receiving said first video signal and the outputs from said first and second threshold sensitive amplifying means, said signal cancellation network being adapted to produce an output signal corresponding to said first video signal with those portions thereof corresponding to radio frequency input signals effecting first and subsequent detector outputs in excess of said first and second predetermined thresholds being substantially cancelled.

11. Signal development means defined in claim 10 wherein said first video signal is of a first polarity with respect to a fixed reference and the outputs from said first and second threshold sensitive amplifying means are of an opposite polarity with respect to said fixed reference, said signal cancellation network including voltage clamping means whereby said first and second signal cancellations are effected substantially to said fixed reference and the output from said signal cancellation network is of a polarity corresponding to that of said first video signal input thereto.

12. Signal development means defined in claim 10, further comprising means associated with each of said first and second threshold sensitive amplifiers by which the predetermined thresholds effecting said first and second video cancellations may be selectively adjusted and switching means connected between said second threshold sensitive amplifying means and said signal cancellation network by which the cancellation effected thereby may be selectively effected.

References Cited in the file of this patent

UNITED STATES PATENTS

| | | |
|---|---|---|
| 2,496,551 | Lawson et al. | Feb. 7, 1950 |
| 2,729,743 | Le Grand | Jan. 3, 1956 |
| 2,777,059 | Stites | Jan. 8, 1957 |